(12) United States Patent
Vander Velde

(10) Patent No.: US 6,437,244 B1
(45) Date of Patent: Aug. 20, 2002

(54) WIRING DUCT SYSTEM HINGE ARRANGEMENT

(75) Inventor: Charles Vander Velde, Frankfort, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 09/867,909

(22) Filed: May 30, 2001

Related U.S. Application Data

(60) Provisional application No. 60/209,299, filed on Jun. 5, 2000.

(51) Int. Cl.⁷ .................................................. H02G 3/00
(52) U.S. Cl. ...................................... 174/68.3; 174/101
(58) Field of Search ........................... 174/48, 68.3, 95, 174/96, 97, 98, 100, 101

(56) References Cited

U.S. PATENT DOCUMENTS

| | | |
|---|---|---|
| 2,263,946 A | 11/1941 | Fletcher |
| 3,403,220 A | 9/1968 | Riedel et al. |
| 3,425,587 A | 2/1969 | Duross, Jr. |
| 3,663,990 A | 5/1972 | Shane |
| 3,697,667 A | 10/1972 | Pollak et al. |
| 3,727,644 A | 4/1973 | Kagan |
| 3,761,603 A | 9/1973 | Hays et al. |
| 3,927,698 A | 12/1975 | Johannsen |
| D269,968 S | 8/1983 | Rodriguez Moura |
| 4,406,379 A | 9/1983 | Anderson et al. |
| 4,423,284 A | 12/1983 | Kaplan |
| 4,560,320 A | 12/1985 | Baus |
| 4,589,449 A | 5/1986 | Bramwell |
| 4,627,469 A | 12/1986 | Buard |
| 4,640,314 A | 2/1987 | Mock |
| D293,098 S | 12/1987 | Layton |
| 4,942,271 A | 7/1990 | Corsi et al. |
| 4,990,722 A | 2/1991 | Benito Navazo |
| 5,013,873 A | 5/1991 | Deibele et al. |

(List continued on next page.)

FOREIGN PATENT DOCUMENTS

| | | |
|---|---|---|
| CA | 582361 | 9/1959 |
| CH | 609177 | 2/1979 |
| DE | 3335-884 A1 | 4/1985 |
| FR | 77 31136 | 10/1977 |
| FR | 2425518 | 12/1979 |
| GB | 1021871 | 3/1966 |

*Primary Examiner*—Dean A. Reichard
*Assistant Examiner*—Adolfo Nino
(74) *Attorney, Agent, or Firm*—Robert A. McCann; Jay A. Saltzman; Christopher S. Clancy

(57) ABSTRACT

A hinged duct system with a hinged cover is provided that includes a base member and a duct cover. The base member has a bottom wall and sidewalls defining a receiving channel. A distal end of at least one of the sidewalls includes a base hook having an inwardly directed flange portion and a convex portion extending outwardly from the receiving channel towards the at least one sidewall. A distal end of the convex portion is spaced from the flange portion to define a cavity therebetween. The duct cover is hingedly attached to the at least one sidewall. The duct cover includes at least one curved end portion forming a hinge end section. The hinge end section includes a cover hook having a distal end receivable in the base member cavity and a cover flange spaced inwardly from the cover hook. When the duct cover is mounted to the base member the cover flange abuts the convex portion of the base hook with a pre-load pressure that creates a point of contact pressure engagement point on the convex portion. The duct cover is pivotal about the hinge end section between open and closed positions and the cover flange maintains a substantially continuous point of contact force against the convex portion sufficient to retain the duct cover in any of various positions between the open and closed positions. A double hinged cover can also be provided.

26 Claims, 9 Drawing Sheets

U.S. PATENT DOCUMENTS

| | | |
|---|---|---|
| 5,089,667 A | 2/1992 | Goussin et al. |
| 5,134,250 A | 7/1992 | Caveney et al. |
| 5,235,136 A | 8/1993 | Santucci et al. |
| 5,523,529 A | 6/1996 | Holliday |
| 5,728,976 A | 3/1998 | Santucci et al. |
| 5,792,992 A | 8/1998 | Handler |
| D402,264 S | 12/1998 | Carlson, Jr. et al. |
| 5,942,729 A | 8/1999 | Carlson, Jr. et al. |
| 5,949,025 A | 9/1999 | Nagai et al. |
| 6,084,180 A | 7/2000 | DeBartolo, Jr. et al. |
| 6,107,575 A | 8/2000 | Miranda |
| 6,107,576 A | 8/2000 | Morton et al. |
| 6,284,794 B1 * | 9/2001 | Olesen et al. ............... 174/68.3 |
| 6,323,421 B1 * | 11/2001 | Pawson et al. ................ 174/48 |
| 6,333,461 B1 * | 12/2001 | Marcou et al. ............ 174/68.3 |

\* cited by examiner

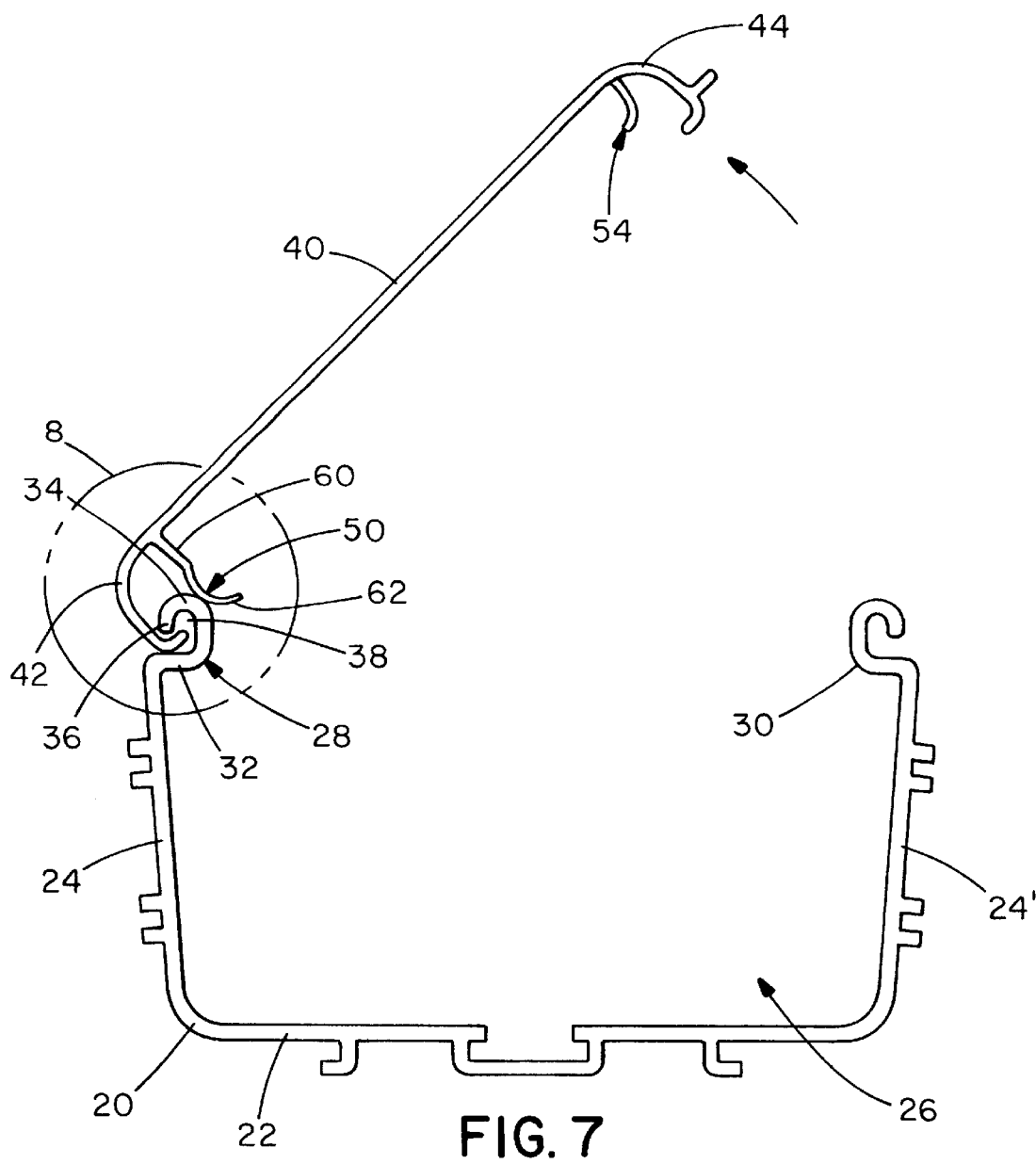
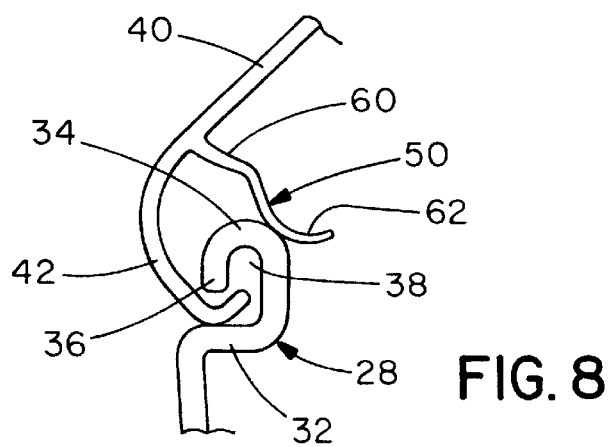

WIRING DUCT SYSTEM HINGE ARRANGEMENT

Applicant claims, under 35 U.S.C. § 119(e), the benefit of priority of the filing date of Jun. 5, 2000, of U.S. Provisional Patent Application Ser. No. 60/209,299, filed on the aforementioned date, the entire contents of which are incorporated herein by reference.

BACKGROUND OF THE INVENTION

1. Field of Invention

The present invention generally relates to a wiring cable duct system including a base section and a cover. More specifically, the invention relates to a duct system cover and base hinge arrangement that allows the cover to rotate from a fully closed position to a fully open position with the ability to selectively hold the duct cover in various ones or all of the positions in between.

2. Description of Related Art

A wide variety of wiring duct and raceway systems are known for routing various types of wires and cables. Typical duct or raceway systems consist of a base member and a cover that may be hinged, snap latched, or otherwise engageable with the base. In operation, it often becomes necessary to remove or open the cover to allow access to the cable containing area of the base member. Frequently, an installer needs to repair, reconfigure or install new cables in the system. Removal, storage and replacement of the cover over the entire system during this process can be time consuming and otherwise problematic. Therefore, many such systems use a hinged duct cover.

Certain duct covers suffer from the inability to open to at least 90° to provide complete access to the base member. Additionally, when a duct cover that fully opens is used, it is more likely to encounter situations due to a restricted area of space in which the cover cannot be fully opened over a portion or portions of the duct system. Thus, an installer needing to lay cables or remove cables can only open the cover along the system up to the obstruction and then is required to hold the restricted cover portion manually in order to continue with the addition and/or removal of cables. An improved duct system is desired.

SUMMARY OF THE INVENTION

It is an object of the invention to provide an improved wiring or cable duct system.

It is another object of the invention to provide a hinge arrangement for a duct cover and base member that provides the ability to selectively hold the duct cover in any of several positions from closed to fully open.

It is a further object of the invention to provide a duct system with a double hinged cover that may be held in several positions.

Various ones of the above and other objects of the invention are achieved by a duct system with a hinged cover, comprising a base member and a duct cover. The base member has a bottom wall and sidewalls defining a receiving channel. A distal end of at least one of the sidewalls includes a base hook having an inwardly directed flange portion and a convex portion extending outwardly from the receiving channel towards the at least one sidewall. A distal end of the convex portion is spaced from the flange portion to define a cavity therebetween. The duct cover is hingedly attached to the at least one sidewall. The duct cover includes at least one curved end portion forming a hinge end section. The hinge end section includes a cover hook having a distal end receivable in the base member cavity and a cover flange spaced inwardly from the cover hook. When the duct cover is mounted to the base member the cover flange abuts the convex portion of the base hook with a pre-load pressure that creates a point of contact pressure engagement point on the convex portion. The duct cover is pivotal about the hinge end section between open and closed positions and the cover flange maintains a substantially continuous point of contact force against the convex portion sufficient to retain the duct cover in any of various positions between the open and closed positions.

Various ones of the above and other objects of the invention are also achieved by a duct system with a double hinged cover, comprising a base member and first and second duct cover halves. The base member has a bottom wall and sidewalls defining a receiving channel. A distal end of a first one of the sidewalls includes a base hook having an inwardly directed flange portion and a "J" shaped convex portion extending outwardly from the receiving channel towards the at least one sidewall. A distal end of the convex portion is spaced from the flange portion to define a cavity therebetween. A distal end of a second one of the sidewalls includes a base hook. The first duct cover half is hingedly attached to the first sidewall. The first cover half includes at least one curved end portion forming a hinge end section and an opposite end portion forming a base hook. The hinge end section includes a cover hook having a distal end receivable in the base member cavity and a cover flange spaced inwardly from the cover hook. The second duct cover half is hingedly attached to the base hook of the first duct cover half. The second duct cover half includes at least one curved end portion forming a hinge end section and an opposite end portion forming a latching end. The latching end includes a hook that latchingly engages with the base hook on the second sidewall. The hinge end section includes a cover hook having a distal end receivable in the cavity of the first duct cover and a cover flange spaced inwardly from the cover hook. When the hinge end sections of the first and second cover halves are mounted to respective base hooks, the cover flanges abut respective base hooks with a pre-load pressure that creates a point of contact pressure engagement point that retains the first and second duct cover halves at a desired rotational position.

BRIEF DESCRIPTION OF THE DRAWINGS

The foregoing and further objects, features and advantages of the present invention will become apparent from the following description of preferred embodiments with reference to the accompanying drawings, wherein:

FIG. 7 is a front view of the duct system of FIG. 1 showing the duct cover retained at an approximately 45° angle;

FIG. 8 is a partial enlargement of the hinge mechanism of FIG. 7;

DETAILED DESCRIPTION OF PREFERRED EMBODIMENTS

Figure 1:
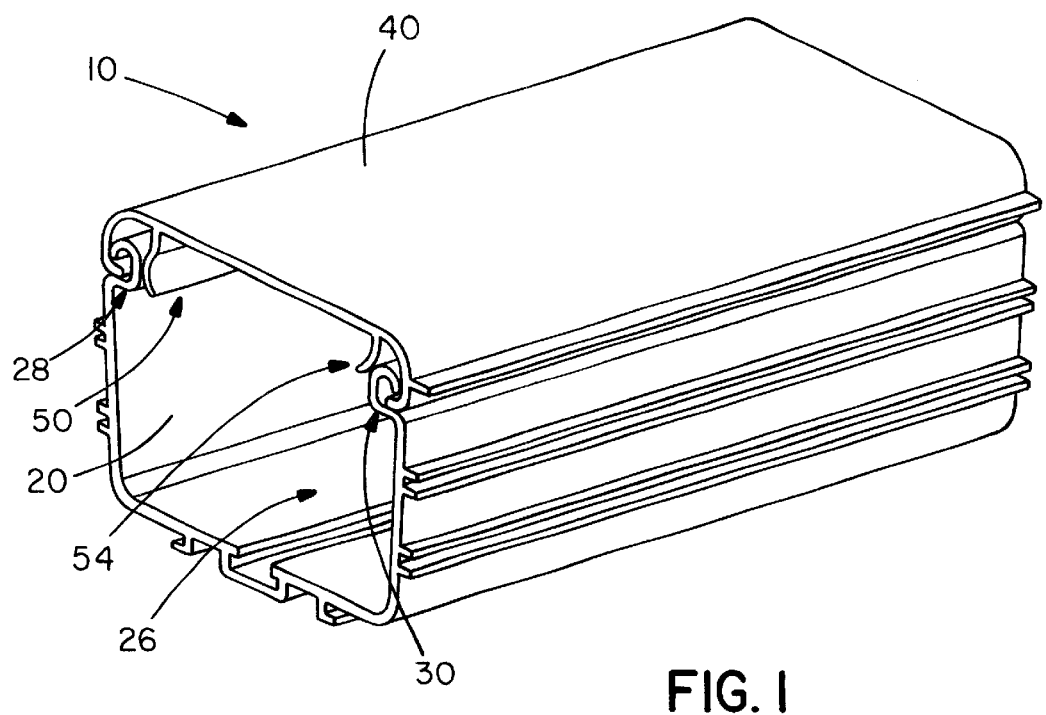
FIG. 1 is a perspective view of a section of a duct system according to the invention.

A first embodiment of a duct section according to the invention will be described with reference to FIGS. 1–10. FIG. 1 shows a duct section 10 including a base 20 and a cover 40 with a hinge arrangement. Duct section 10 can be formed of any suitable material, but is preferably formed from a plastic material such as PVC.

Figure 2:
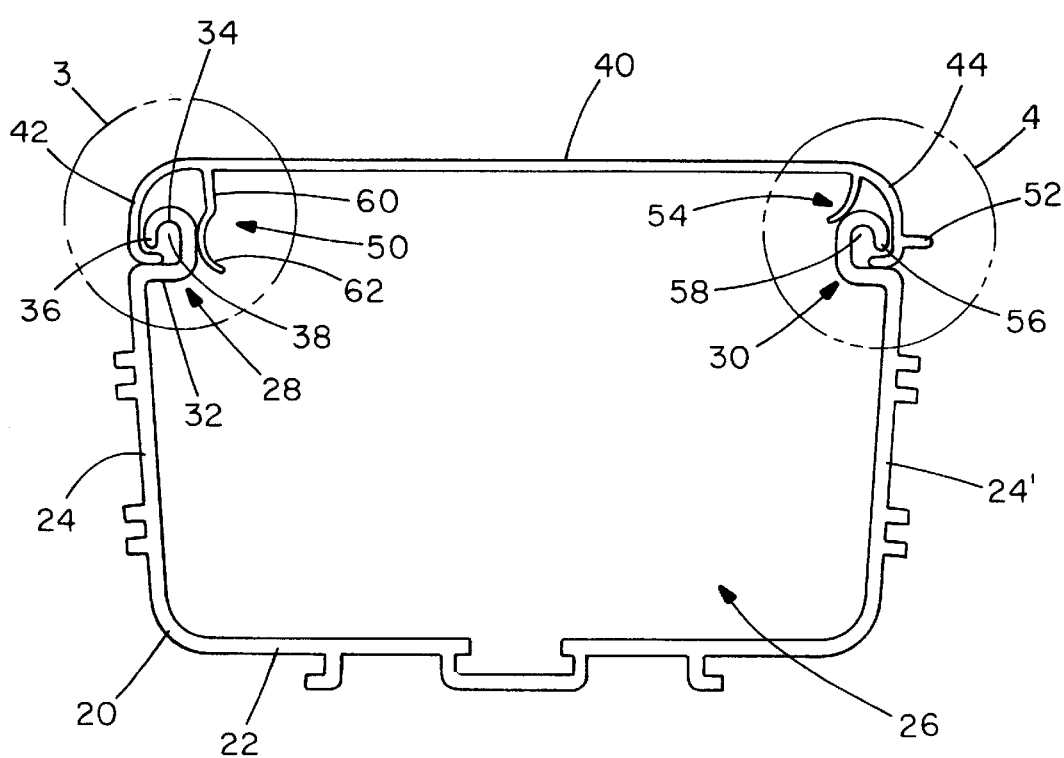
FIG. 2 is a front view of a duct system according to the invention.

As shown in FIG. 2, base 20 is formed generally in a U-shape and includes a bottom wall 22 and sidewalls 24, 24', which may be integrally formed or otherwise affixed together. Bottom wall 22 and sidewalls 24, 24' define a receiving channel 26 for wiring or the like. Distal ends of sidewalls 24, 24' preferably include identical but reversed base section hooks 28, 30 formed by a first inwardly directed flange portion 32 and a second portion 34 formed as a reverse "J". Provision of two base section hooks allows for reversible installation of cover 40 and the ability to open the cover in either of opposite directions.

Cover 40 is preferably generally planar with curved end portions forming a hinge end section and a latching end section. The hinge end section includes a hook 42 formed at an end of cover 40 that corresponds to distal end 36 of hook 28 of base 20. A flange 50 is also formed on cover 40 and spaced inwardly from hook 42. As better described below, flange 50 cooperates with hook 42 so as to engage with hook 28 to secure cover 40 to base 20 and retain the cover in an open position.

The latching side of duct cover 40 includes hook 44 that latchingly engages with distal edge 56 of hook 30 formed on latching sidewall 24' so as to at least partially extend into a cavity 58. As better discussed below, the latching side of cover 40 also includes a flange 54 that is spaced apart from hook 44 and acts in conjunction therewith to cooperatively engage hook 30. A latch 52 extends outwardly from hook 44 that allows a user to release cover 40 from base 20 by lifting up on latch 52 while pushing in on sidewall 24'. Alternatively, the latching end of cover 40 may be flexible to allow for release upon flexure of cover 40 when a user lifts up on latch 52.

Duct section 10 is shown in FIG. 2 in a fully closed position on base 20. In this position, cover 40 is snap locked onto base 20 on both the hinge end section and the latch end section as described above.

Figure 3:
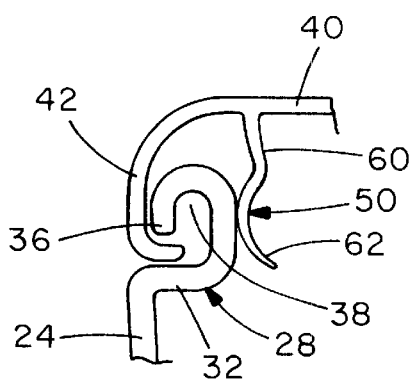
FIG. 3 is a partial enlargement of a hinge mechanism in the duct system of FIG. 1.
Figure 4:
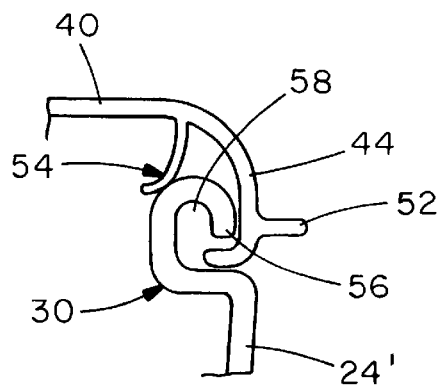
FIG. 4 is a partial enlargement of a latch mechanism in the duct system of FIG. 1.
Figure 5:
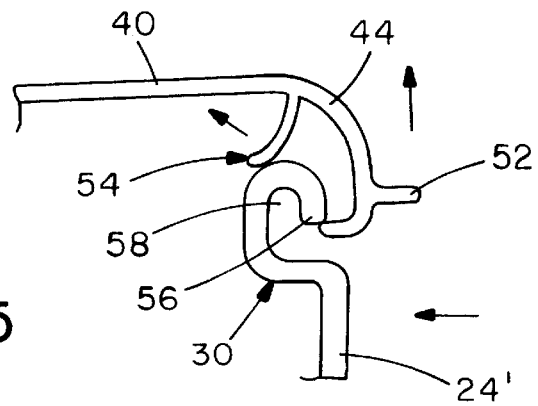
FIG. 5 is a partial enlargement of a latch mechanism shown releasing a duct cover according to the invention.
Figure 6:
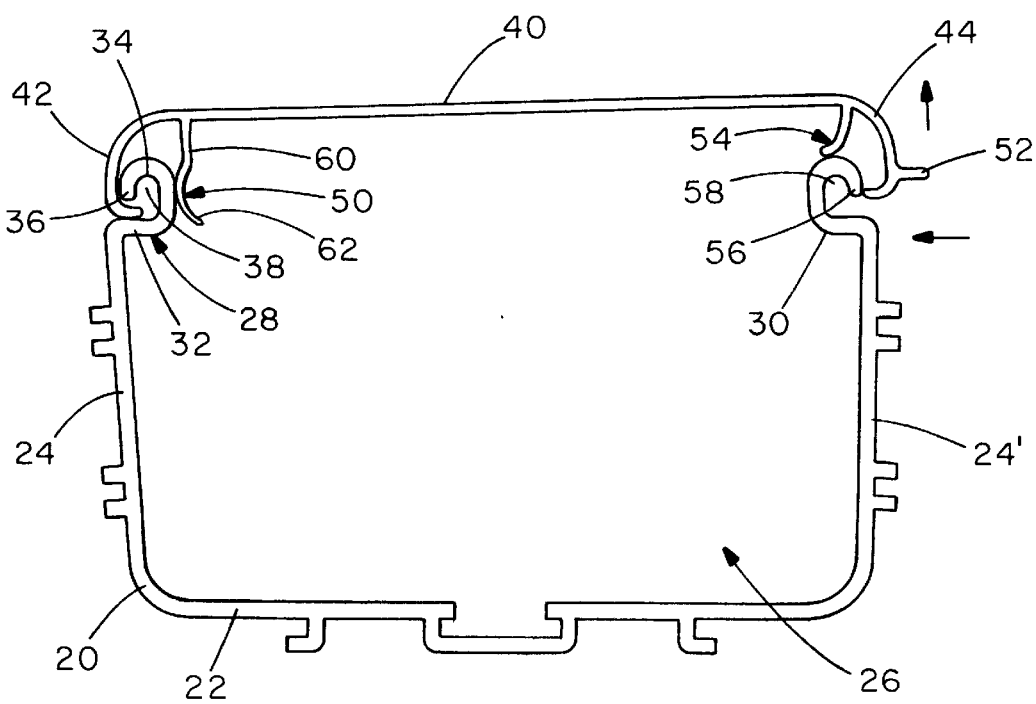
FIG. 6 is a front view of the duct system of FIG. 1 with the latch mechanism released.

FIGS. 3–5 show additional details of the duct section 10. Flange 50 includes a first straight portion 60 and a curved second portion 62. First portion 60 extends downward from a position along cover 40 just past the plane of the straight portion of "J" hook portion 34. Curved second portion 62 is generally "C" shaped with the bow extending inwards towards hook portion 34. In a natural state unmounted to the base member, the second portion would extend beyond the plane of the straight portion of the "J" hook portion 34 (i.e., more towards hook 42) such that in the shown mounted state second portion 62 is biased at a point of contact against hook portion 34 of hook 28 when cover 40 is engaged with base 20. As cover 40 opens toward a fully open position, curved second portion 62 preferably continuously maintains a point of contact and a biasing force against hook 28. The biasing force applied by second portion 62 is sufficient to retain the duct cover in place. Without the continuous point of contact, there may be positions where the hinge assembly will not retain the cover. Thus, when the ability to retain the cover at a near infinite number of intermediate positions is desirable, the continuous point of contact is necessary. Additionally, with this arrangement, there is no position along the hinge rotation that does receive at least a minimum required retention force applied by the arrangement.

Referring to FIGS. 6–10, cover 40 is released on the latching side and hook 42 rotates into cavity 38 of hook 28. Flange 50 is designed such that second portion 62 maintains tension against hook portion 34 of hook 28 as hook 42 rotates along hook 28. This continuous point of contact allows the user to release duct cover 40 at any position and the duct cover will maintain its particular opened position. That is, duct cover 40 can be positioned and maintained in both fully open and fully closed positions as well as any intermediate position.

FIGS. 7–8 show duct cover 40 in an approximately 45° open position. As can be seen, the pre-load of flange 50 against hook 28 continues as flange 50 rotates around the radiused top geometry of hook portion 34. Curved second portion 62 creates a point of contact pressure engagement point on hook section 34. During rotation, the end of hook 42 partially enters cavity 38.

Figure 9:
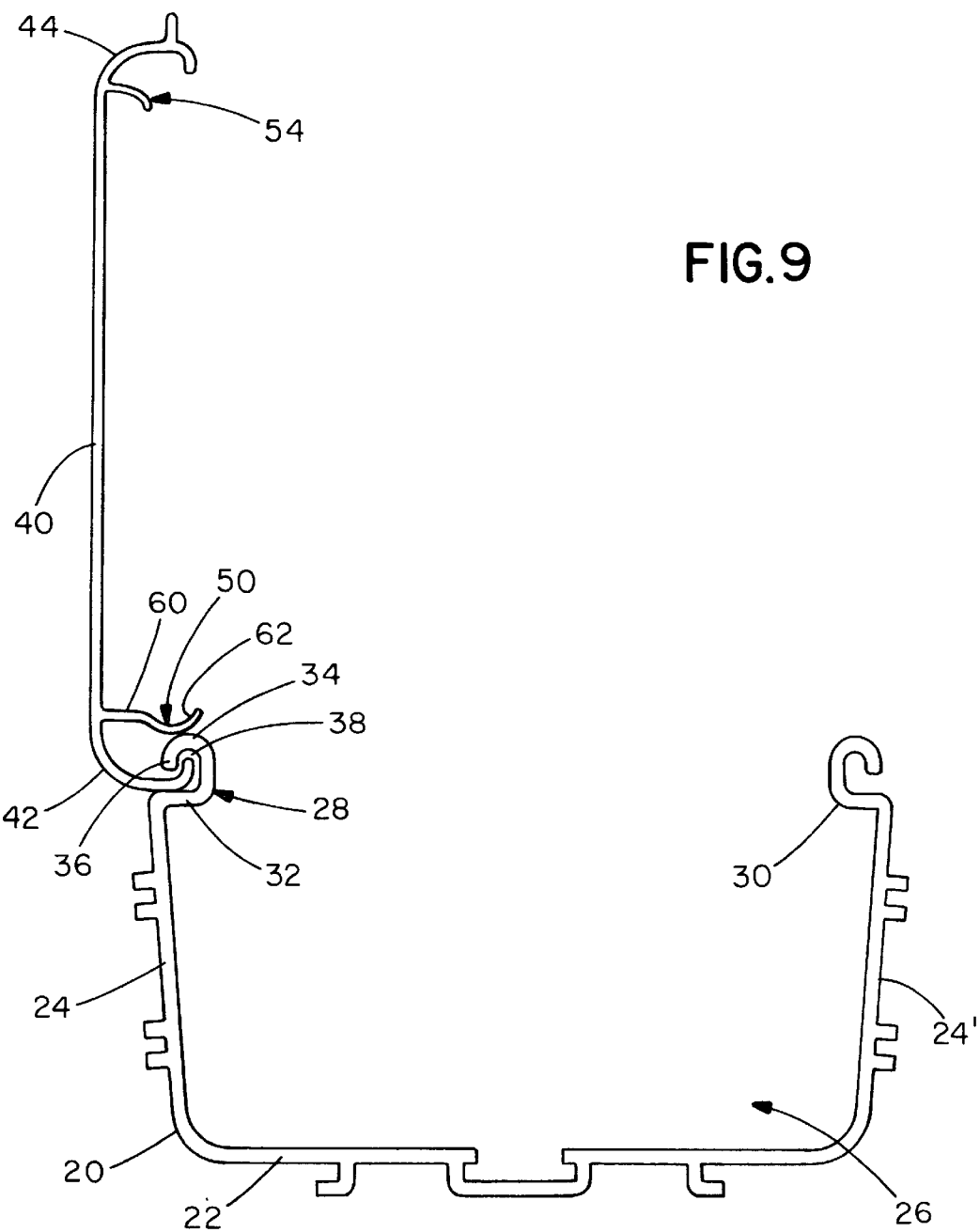
FIG. 9 is a front view of the duct system of FIG. 1 with the duct cover retained in a fully opened position.
Figure 10:
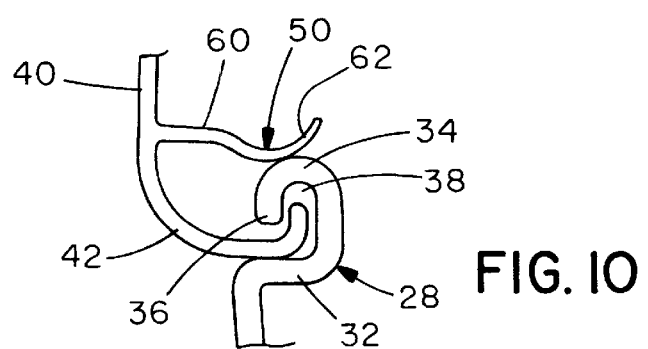
FIG. 10 is a partial enlargement of the duct hinge mechanism of FIG. 9.
Figure 11:
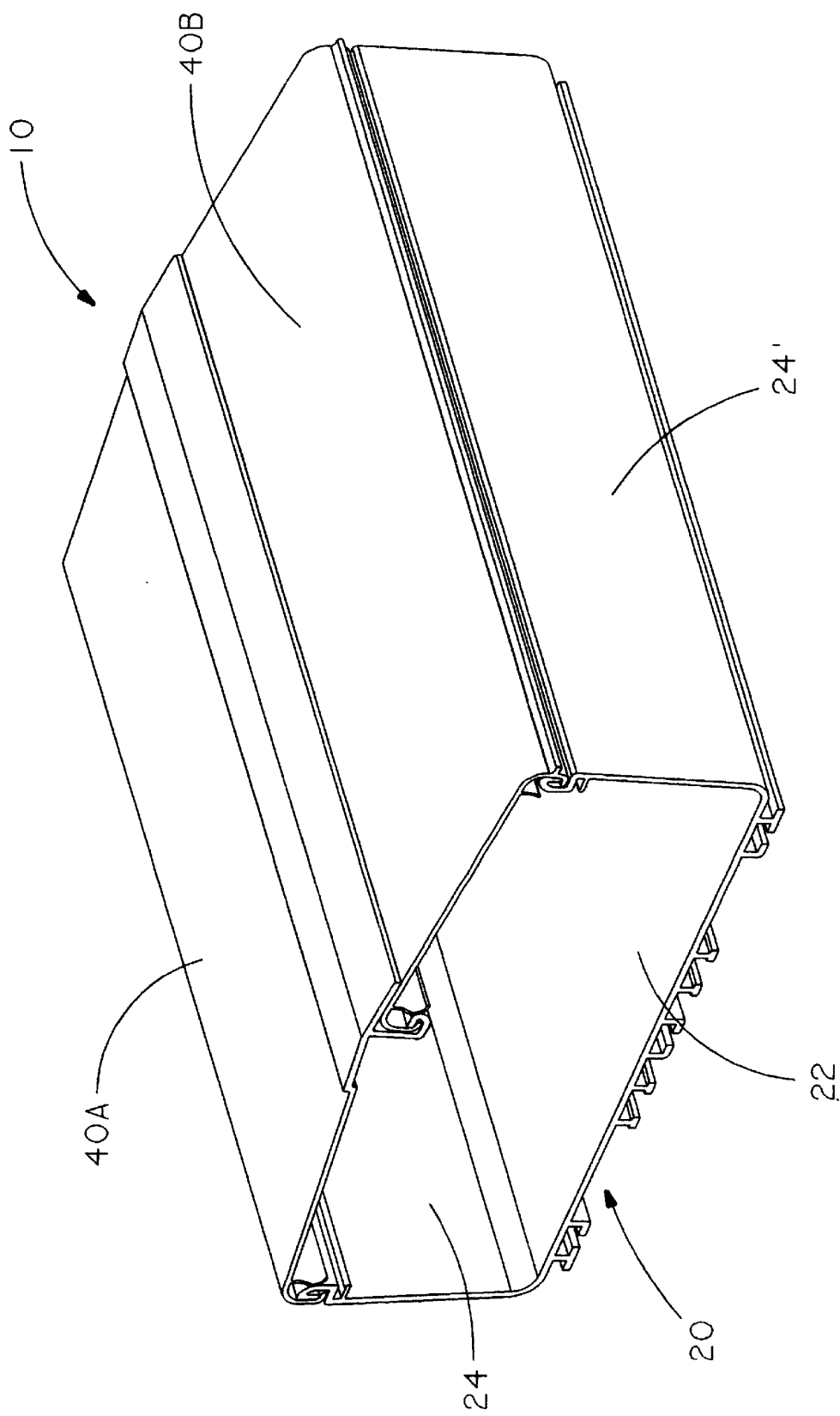
FIG. 11 is a perspective view of a duct system with a double hinged cover According to the invention in a fully closed position.
Figure 12:
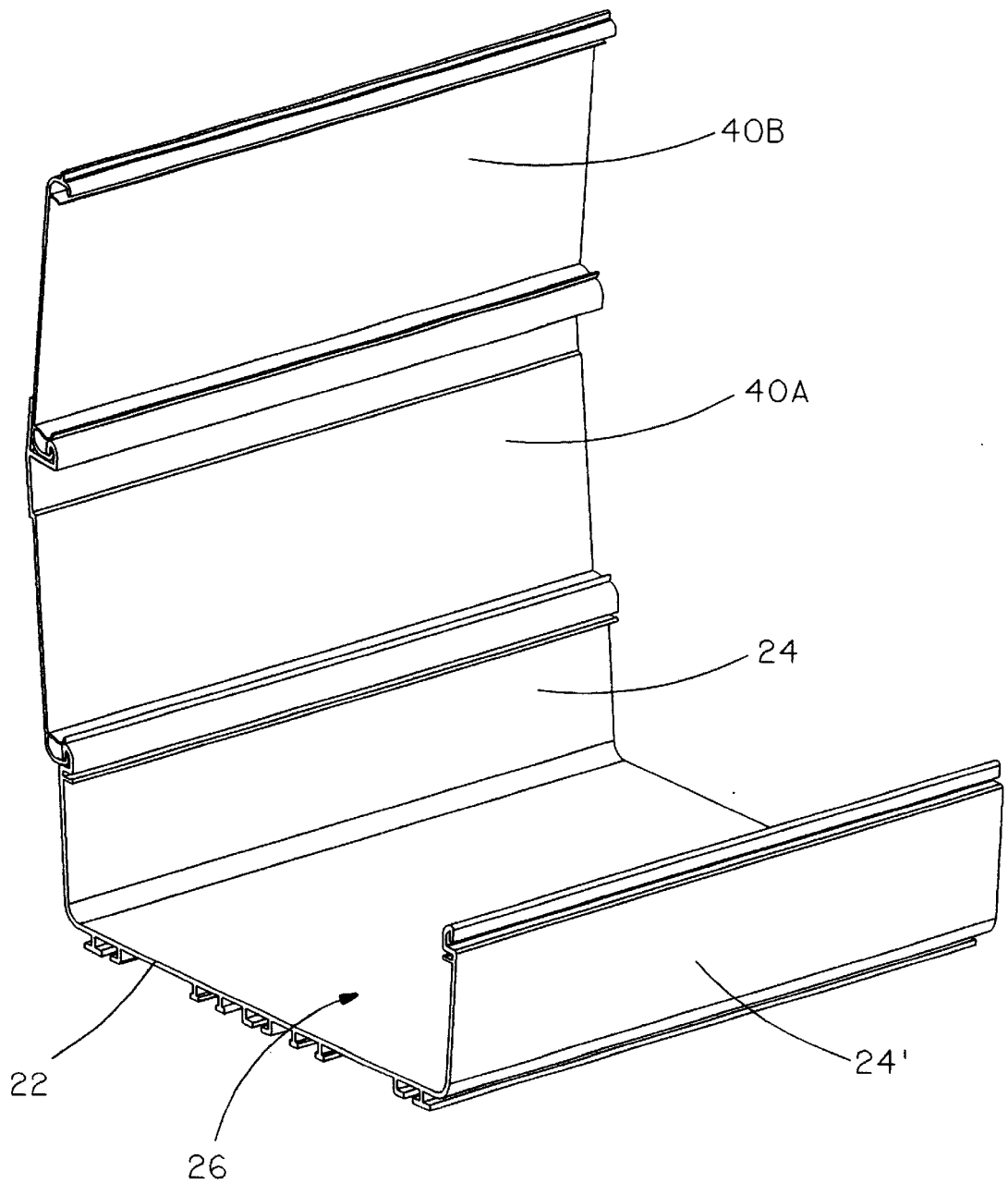
FIG. 12 is a perspective view of the duct system of FIG. 11 in a fully open position.
Figure 13:
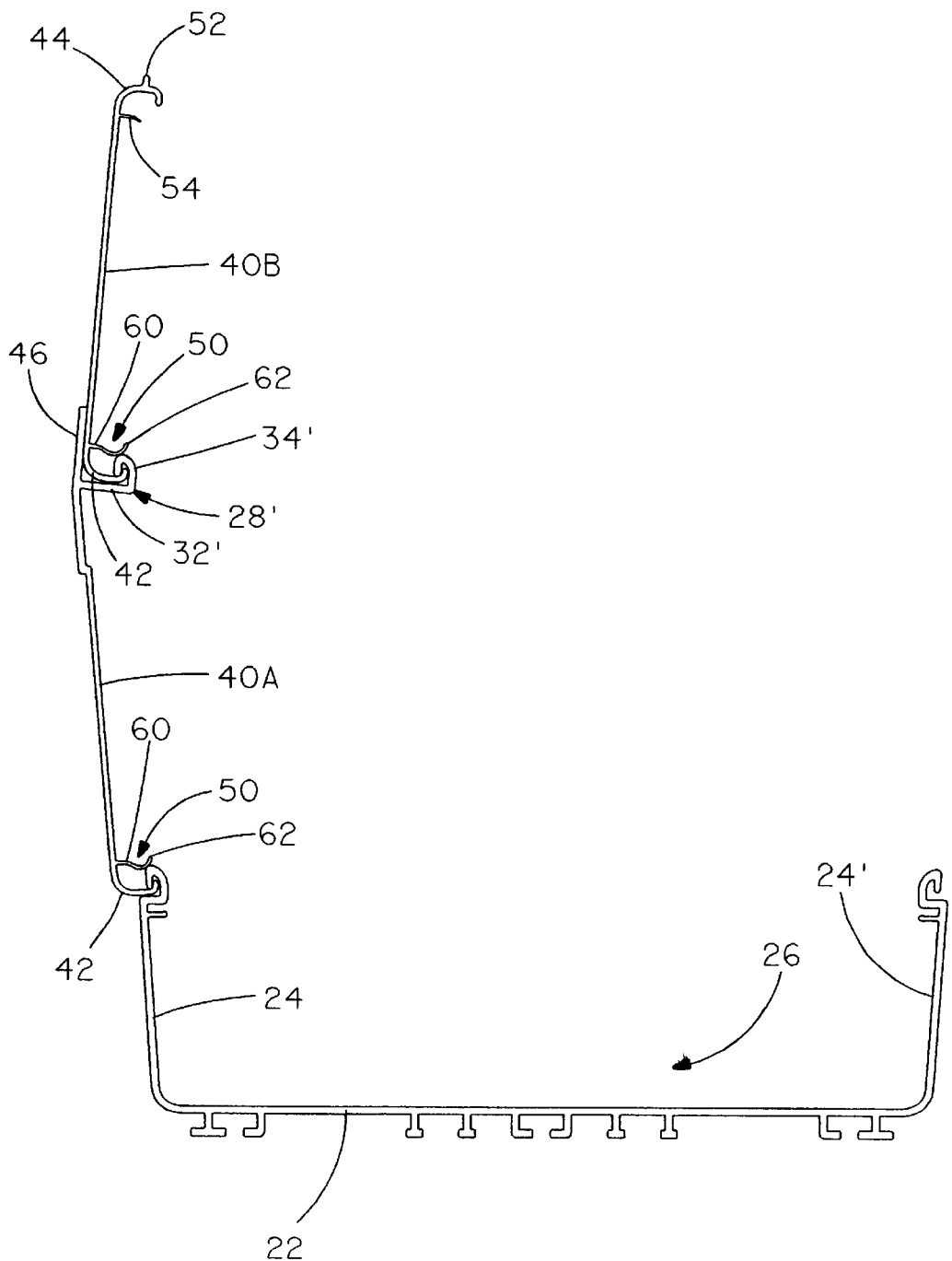
FIG. 13 is a front view of the duct system of FIG. 12.
Figure 14:
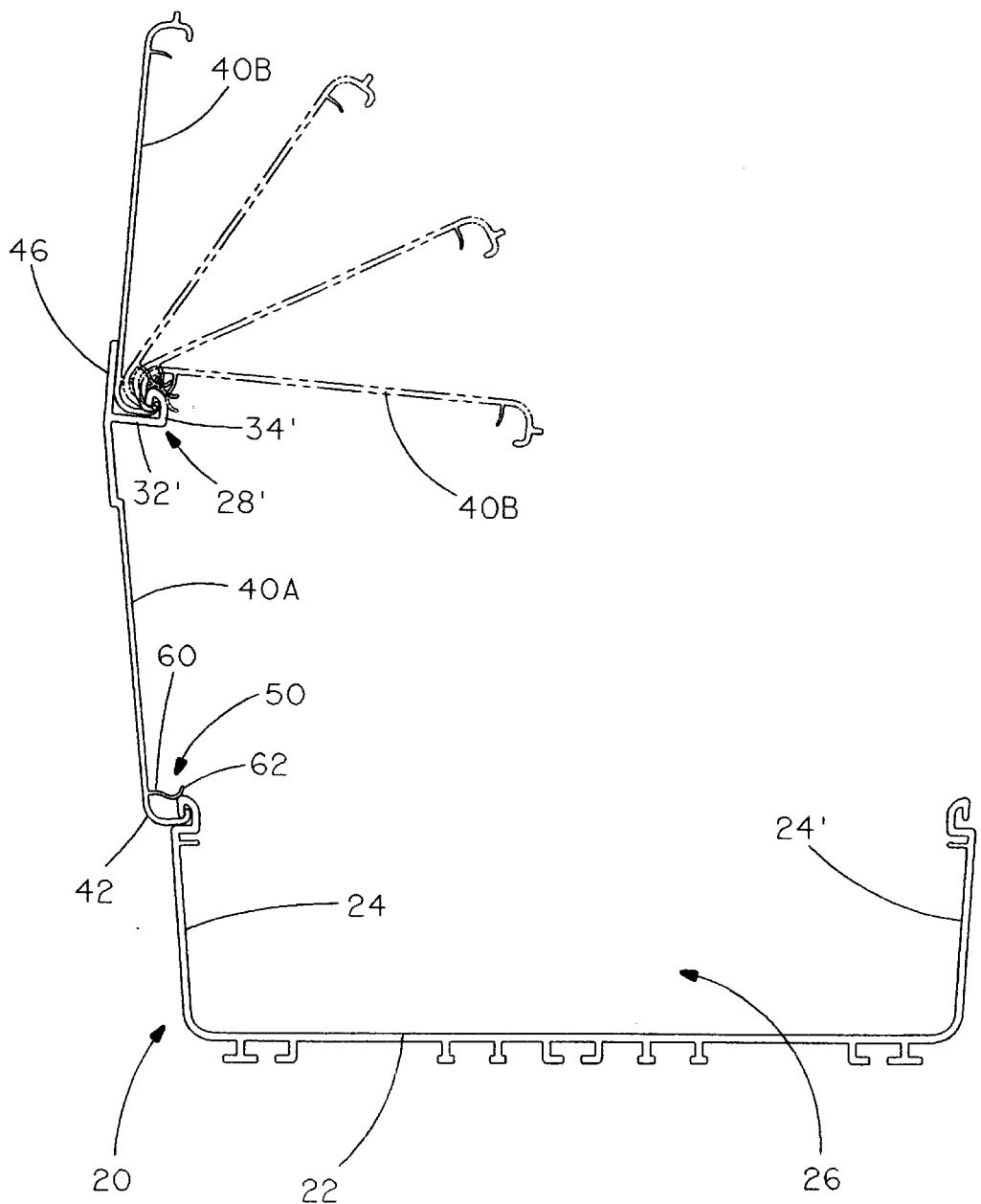
FIG. 14 is a front view of the duct system of FIG. 13 showing a leftmost half of the double hinged cover in a fully open position and the rightmost half shown in various positions.

FIGS. 9–10 show duct cover 40 in a full open position of at least 90°. In this position, hook 42 has rotated fully into cavity 38. Thus, the cavity 38 may provide a stop that limits rotation of cover 40. Also, a vertical outer edge of hook 42 on cover 40 abuts and locks against horizontal flange portion 32 of hook 28 on sidewall 24 and may also form a stop.

FIGS. 11–16 show another embodiment of the invention. Base 20 remains as in the previous embodiment or may be wider. However, cover 40 in this embodiment is comprised of a double hinged cover having a leftmost half 40A and a rightmost half 40B. The two cover halves 40A, 40B may operate in unison as shown and be placed in a fully closed position (FIG. 11), a fully open position (FIGS. 12–13), or in various intermediate positions. Moreover, as best evidenced by FIGS. 13–14, the two halves are capable of independent operation.

The latching side of rightmost half 40B corresponds to the latching side of the single cover 40 in the first embodiment and operates the same. As such, it includes a hook 44, a flange 54, and a latch 52. The hinge end section of the leftmost half 40A corresponds to the hinge end section of the single cover 40 in the first embodiment and operates the same. As such, it includes a hook 42 and a flange 50.

Figure 15:
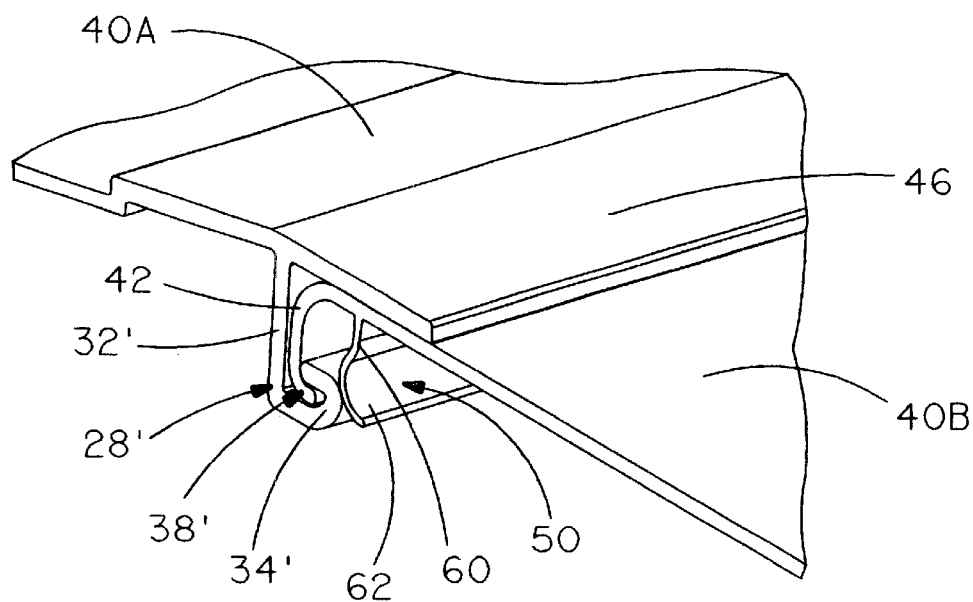
FIG. 15 is a partial enlargement of the hinge arrangement interconnecting the two duct cover halves in a fully closed position.
Figure 16:
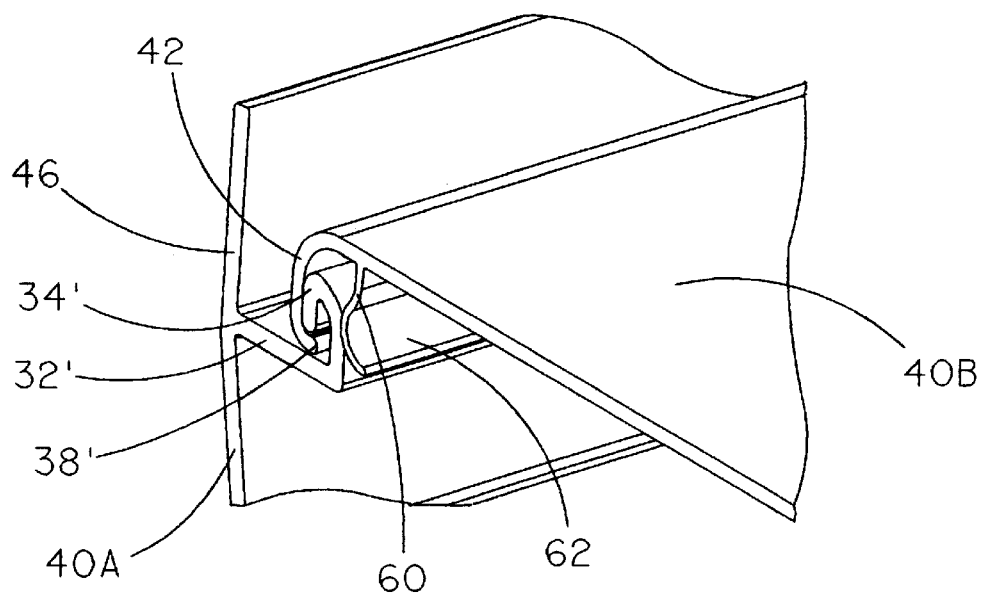
FIG. 16 is a partial enlargement of the hinge arrangement interconnecting the two duct cover halves with the rightmost half pivoted relative to the leftmost half.

As best shown in FIGS. 15–16, the hinge end section of the rightmost half 40B also corresponds to the hinge end section of the single cover 40 and includes a hook 42 and a flange 50 with first portion 60 and curved portion 62. However, flange 50 cooperates and mates with a hook 28' on a distal end of the leftmost half 40A that generally corresponds to hook 28 of base section 20, but is oriented 90° relative thereto as shown. In particular, hook 28' includes a straight portion 32' and a reversed "J" shaped portion 34' having a cavity 38' therebetween. Leftmost half 40A also includes an extending surface 46 that extends generally transverse to straight portion 32' and forms an abutment surface that limits rotation of cover 40B relative to 40A. This abutment surface 46 also prevents cover halves 40A, 40B from bending or deflecting inward into cavity 26 when forces act on covers 40A, 40B towards the cavity 26.

While shown with symmetrical structure, the distal ends of base sidewalls 24, 24' do not both require base section hooks. If reversibility is not necessary, only one sidewall requires a base section hook that mates with the hinge end of duct cover 40. As such, the end of duct cover 40 opposite the hinge end may just extend over and rest upon a top of the corresponding sidewall. Even when latching of the cover is desirable, the sidewall corresponding to the latching side of the duct cover may have a simpler hook structure. Such a latching side base hook may take the form of a simple protruding ledge or indented groove that allows for snap fitting of the distal end of cover hook 44.

While the invention has been shown and described in conjunction with specific exemplary embodiments, the invention is not limited to these. It will be obvious to those skilled in the art that changes and modifications may be made without departing from the teachings of this invention and that the matter set forth in the foregoing description and accompanying drawings is offered by way of illustration only and not as a limitation. For example, while described with respect to applicability to a wiring duct, the invention may be used in other duct or channel systems that could benefit from a hinged cover structure. Additionally, while shown and described with respect to a full duct cover, it is to be understood that the invention could be utilized with a smaller cover segment that acts as a cable retaining member. The actual scope of the invention is intended to be defined in the following appended claims.

What is claimed is:

1. A hinged duct system with a cover, comprising:
   a base member with a bottom wall and sidewalls defining a receiving channel, a distal end of at least one of said sidewalls including a base hook having an inwardly directed flange portion and a convex portion extending outwardly from said receiving channel towards said at least one of said sidewalls, a distal end of said convex portion being spaced from said flange portion to define a base member cavity therebetween;
   a duct cover hingedly attached to said at least one of said sidewalls, said duct cover including a hinge end section, said hinge end section including a cover hook having a distal end receivable in said base member cavity and a cover flange spaced inwardly from said cover hook, wherein when said duct cover is mounted to said base member said cover flange abuts said convex portion of said base hook with a pre-load pressure that creates a point of contact pressure engagement point on said convex portion, said duct cover being pivotal about said hinge end section between open and closed positions and said cover flange maintaining a substantially continuous point of contact force against said convex portion sufficient to retain said duct cover in any of various positions between the open and closed positions.

2. The hinged duct system of claim 1, wherein said convex portion is "J" shaped.

3. The hinged duct system of claim 1, wherein said cover flange includes a first portion extending downward from said duct cover and a second curved portion with a bow extending inward towards said base hook.

4. The hinged duct system of claim 3, wherein said second curved portion is "C" shaped.

5. The hinged duct system of claim 1, wherein an end of said duct cover opposite said hinge end section forms a latching end and includes a hook that latchingly engages with a base hook on a corresponding one of said base sidewalls.

6. The hinged duct system of claim 5, wherein at least one of said latching end of said duct cover and said corresponding base sidewall are flexible so as to allow release of the latching end of said duct cover from said corresponding sidewall.

7. The hinged duct system of claim 5, wherein said base hook on said corresponding sidewall is a mirror image of said other base hook.

8. The hinged duct system of claim 7, wherein both said base hooks have a "J" shaped convex portion.

9. The hinged duct system of claim 7, wherein said latching end includes a flange spaced inwardly from said latching end hook that engages said corresponding base hook when said duct cover is in a fully closed position.

10. The hinged duct system of claim 5, further comprising a latch extending outwardly from said latching end.

11. The hinged duct system of claim 1, wherein said duct cover is positionable and retainable at multiple positions including a fully closed position, an intermediate 45 degree position and a fully open position of at least 90 degrees.

12. The hinged duct system of claim 1, wherein said cover flange maintains a constant point of contact with at least a minimum pressure against said base hook during rotation of said duct cover such that said duct cover is retainable at any position between said open and closed positions.

13. The hinged duct system of claim 1, wherein said duct cover is a double hinged cover having two cover halves.

14. The hinged duct system of claim 13, wherein each cover half includes a curved end portion having a hinge end section with a cover hook that hingedly mates with a base hook having an inwardly directed flange portion and a convex portion.

15. The hinged duct system of claim 14, wherein one of said cover halves includes a base hook on an end opposite said curved end portion, said base hook of said one cover half receiving said cover hook of said other cover half.

16. The hinged duct system of claim 15, wherein said convex portion of said base hook on said one cover half is "J" shaped.

17. The hinged duct system of claim 15, wherein said one half further includes an abutment surface at said opposite end that limits rotation of said other cover half.

18. The hinged duct system of claim 1, wherein said cover is formed from a plastic.

19. The hinged duct system of claim 1, wherein said duct cover includes at least one curved end portion forming a hinge end section.

20. A hinged duct system with a double hinged cover, comprising:
   a base member with a bottom wall and sidewalls defining a receiving channel, a distal end of a first one of said sidewalls including a base hook having an inwardly directed flange portion and a convex portion extending outwardly from said receiving channel towards said first one of said sidewalls, a distal end of said convex portion being spaced from said flange portion to define a base member cavity therebetween, a distal end of a second one of said sidewalls including a base hook;

a first duct cover half hingedly attached to said first one of said sidewalls, said first duct cover half including a hinge end section and a base hook, said hinge end section including a cover hook having a distal end receivable in said base member cavity and a cover flange spaced inwardly from said cover hook;

a second duct cover half hingedly attached to said base hook of said first duct cover half, said second duct cover half including a hinge end section and a latching end, said latching end including a hook that latchingly engages with said base hook on said second one of said sidewalls, said hinge end section including a cover hook having a distal end receivable in said base member cavity of said first duct cover half and a cover flange spaced inwardly from said cover hook, wherein when said hinge end section of said second duct cover half is mounted to said base hook of said first duct cover half, said cover flange abuts said base hook with a pre-load pressure that creates a point of contact pressure engagement point that retains said second duct cover half at a desired rotational position.

21. The hinged duct system of claim 20, wherein when said hinge end section of said first duct cover half is mounted to said basehook of said first sidewall, said cover flange abuts said base hook with a pre-load pressure that creates a point of contact pressure engagement point that retains said first duct cover half at a desired rotational position.

22. The hinged duct system of claim 20, wherein said convex portion is "J" shaped.

23. The hinged duct system of claim 20, wherein said first duct cover half includes at least one curved end portion forming a hinge end section and an opposite end portion forming a base hook, and said second duct cover half includes at least one curved end portion forming a hinge end section and an opposite end portion forming a latching end.

24. A hinged duct system with a hinged cover, comprising:
- a base member with a bottom wall and sidewalls defining a receiving channel, a distal end of a first one of said sidewalls including a base hook having an inwardly directed flange portion and a convex portion extending outwardly from said receiving channel towards said first one of said sidewalls, a distal end of said convex portion being spaced from said flange portion to define a base member cavity therebetween, a distal end of a second one of said sidewalls including a base hook;
- a duct cover hingedly attached to said first one of said sidewalls, said duct cover including a hinge end section and a latching end, said hinge end section including a cover hook having a distal end receivable in said base member cavity and a cover flange spaced inwardly from said cover hook, said latching end including a hook that latchingly engages with said base hook on said second one of said sidewalls, wherein when said duct cover is mounted to said base member said cover flange abuts said convex portion of said base hook of said first one of said sidewalls with a pre-load pressure that creates a point of contact pressure engagement point on said convex portion, said duct cover being pivotal about said hinge end section between open and closed positions and said cover flange maintaining a substantially continuous point of contact force against said convex portion sufficient to retain said duct cover in any of various positions between the open and closed positions.

25. The hinged duct system of claim 24, wherein said convex portion is "J" shaped.

26. The hinged duct system of claim 24, wherein said duct cover includes at least one curved end portion forming a hinge end section and an opposite end portion forming a latching end.

* * * * *